(12) United States Patent
Talebiesfandarani et al.

(10) Patent No.: US 12,234,148 B2
(45) Date of Patent: Feb. 25, 2025

(54) METHOD OF PREPARING LITHIUM METAL PHOSPHATE CATHODE MATERIALS

(71) Applicant: Rivian IP Holdings, LLC, Irvine, CA (US)

(72) Inventors: Majid Talebiesfandarani, Emeryville, CA (US); Soo Kim, Fremont, CA (US); Ki Tae Park, Santa Clara, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 483 days.

(21) Appl. No.: 17/743,071

(22) Filed: May 12, 2022

(65) Prior Publication Data

US 2023/0365410 A1    Nov. 16, 2023

(51) Int. Cl.
| | |
|---|---|
| C01B 25/30 | (2006.01) |
| C01B 25/45 | (2006.01) |
| H01M 4/58 | (2010.01) |
| H01M 10/0525 | (2010.01) |

(52) U.S. Cl.
CPC ............ *C01B 25/306* (2013.01); *C01B 25/45* (2013.01); *H01M 4/5825* (2013.01); *H01M 10/0525* (2013.01); *C01P 2006/40* (2013.01)

(58) Field of Classification Search
None
See application file for complete search history.

(56) References Cited

U.S. PATENT DOCUMENTS

| | | | |
|---|---|---|---|
| 8,586,242 B2 * | 11/2013 | Chou | .................... H01M 4/131 |
| | | | 423/306 |
| 2012/0007021 A1 * | 1/2012 | Beppu | .................. H01M 4/5825 |
| | | | 252/182.1 |
| 2015/0210546 A1 * | 7/2015 | Song | ........................ B01J 19/24 |
| | | | 252/182.1 |

* cited by examiner

*Primary Examiner* — Gregg Cantelmo
(74) *Attorney, Agent, or Firm* — Foley & Lardner LLP (57) ABSTRACT

A process of preparing a lithium metal phosphate includes contacting a water-soluble metal precursor, a water-insoluble metal precursor, and a phosphate precursor in an acidic aqueous medium; to form a reaction mixture; precipitating from the reaction mixture a metal phosphate; collecting the metal phosphate; combining the metal phosphate with a lithium precursor; and calcining the combined metal phosphate and lithium precursor at elevated temperature to form a lithium metal phosphate; wherein a mol ratio of water-soluble metal precursor to water-insoluble metal precursor is from 0.5:99.5 to 99.5:0.5.

20 Claims, 5 Drawing Sheets

METHOD OF PREPARING LITHIUM METAL PHOSPHATE CATHODE MATERIALS

INTRODUCTION

This disclosure is generally directed to a processes for the preparation of olivine-type $LiMPO_4$ (M=Fe, Mn, Co, Ni, and mixture) cathode materials, useful in lithium-ion batteries. The chemical process is expected to utilize lower cost raw iron, lithium, and phosphate precursor materials, thus reducing the overall cost of the final $LiMPO_4$ cathode materials and consequently the overall cost of lithium-ion batteries containing such cathode materials.

SUMMARY

In one aspect, a process of preparing a lithium metal phosphate includes contacting a water-soluble metal precursor, a water-insoluble metal precursor, and a phosphate precursor in an acidic aqueous medium; to form a reaction mixture; precipitating from the reaction mixture a metal phosphate; collecting the metal phosphate; combining the metal phosphate with a lithium precursor; and calcining the combined metal phosphate and lithium precursor at elevated temperature to form a lithium metal phosphate; wherein a mol ratio of water-soluble metal precursor to water-insoluble metal precursor is from 0.5:99.5 to 99.5:0.5.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Lithium iron phosphate, $LiFePO_4$, having the olivine structure, can (de-)intercalate $Li^+$ ions during the charge and discharge processes in the cathode side of lithium ion batteries. Several chemical synthesis processes have been proposed for the manufacture of $LiFePO_4$ and doped- or substituted-$LiFePO_4$ via solid-state synthesis, hydrothermal, and co-precipitation processes. However, large variations in the powder purity, particle size distribution, morphology, crystallinity, and subsequent electrochemical performance of $LiFePO_4$ materials have been observed, and are dependent upon the synthesis process routes and conditions. For example, impurities secondary phases such as $Fe_2P$, $Fe_2P_2O_7$, $Li_4P_2O_7$, and/or $Li_3Fe_2(PO_4)_3$, and the like are formed during the solid-state process route. Additionally, it is difficult to control and obtain uniform, small particle size distributions using the solid-state synthesis processes. In comparison, hydrothermal processes are more complicated and require an autoclave reactor vessel that can achieve high pressure, also producing Li containing byproducts.

It has now been found that olivine-type $LiMPO_4$ (M=Fe, Mn, Co, Ni, and mixture) cathode materials may be prepared by aqueous methods from a combination of water-soluble metal precursors, water-insoluble metal precursors, and a phosphorus source in the presence of an acidic aqueous medium. The chemical process may be adapted to employ low-cost raw precursor materials including iron, lithium, and phosphate sources, reducing the cost of $LiMPO_4$, $LiFe_xMn_{1-x}PO_4$ (0≤x≤1), and $LiMnPO_4$ cathode active materials.

In one aspect, a process is provided for preparing a lithium metal phosphate. The process includes contacting a water-soluble metal precursor, a water-insoluble metal precursor, and a phosphate precursor in an acidic aqueous medium; to form a reaction mixture. From the reaction mixture is precipitated a metal phosphate. The metal phosphate is then collected, and combined with a lithium precursor, the combination of which is then calcined at elevated temperature to form the lithium metal phosphate. The mol ratio of water-soluble metal precursor to water-insoluble metal precursor is from 0.5:99.5 to 99.5:0.5.

The lithium metal phosphates are those that may be based upon iron, mangansese, cobalt, nickel, or a combination of any two or more thereof. Accordingly, the water-insoluble metal precursor may include materials such as, but not limited to, iron metal (or, its nanopowder), iron oxide, manganese metal (or, its nanopowder), a manganese oxide, cobalt metal (or, its nanopowder), a cobalt oxide, nickel metal (or, its nanopowder), a nickel oxide, or a mixture of any two or more thereof. While the water-soluble metal precursor may include materials such as a metal halide ($MF_x$, $MCl_x$, $MBr_x$, $MI_x$), a metal nitrate ($M(NO_3)_x$), a metal sulfate ($M(SO_4)_x$), or their hydrate forms ($\cdot xH_2O$), a mixture of any two or more thereof. Illustrative water-soluble metal precursors include, but are not limited to, $FeCl_2$, $FeCl_3$, $FeCl_2\cdot 4H_2O$, $FeCl_3\cdot 6H_2O$, $Fe(NO_3)_3$, $Fe(NO_3)_3\cdot 6H_2O$, $Fe(NO_3)_3\cdot 9H_2O$, $FeSO_4$, $FeSO_4\cdot 6H_2O$, $FeSO_4\cdot 7H_2O$, $MnCl_2$, $MnCl_2\cdot H_2O$, $MnCl_2\cdot 4H_2O$, $MnCl_2\cdot xH_2O$, $Mn(NO_3)_2$, $Mn(NO_3)_2\cdot xH_2O$, $Mn(NO_3)_2\cdot 4H_2O$, $MnSO_4$, $MnSO_4 \cdot xH_2O$, $MnSO_4 \cdot 4H_2O$, $NiCl_2$, $NiCl_2 \cdot 6H_2O$, $Ni(NO_3)_2$, $Ni(NO_3)_2 \cdot 6H_2O$, $NiSO_4$, $NiSO_4 \cdot 6H_2O$, $NiSO_4 \cdot 7H_2O$, $CoCl_2$, $CoCl_2 \cdot xH_2O$, $CoCl_2 \cdot 6H_2O$, $Co(NO_3)_2$, $Co(NO_3)_2 \cdot 6H_2O$, $CoSO_4$, $CoSO_4 \cdot xH_2O$, $CoSO_4 \cdot 7H_2O$, or a mixture of any two or more thereof. In some embodiments, the water-insoluble metal source may be $Fe_2O_3$, $Fe_3O_4$, $FeO$, $FeC_2O_4$, $FeC_2O_4 \cdot 2H_2O$, or a mixture of any two or more thereof. Illustrative lithium precursors include, but are not limited to, $LiOH$, $LiOH \cdot H_2O$, $Li_2CO_3$, $LiHCO_3$, or a mixture of any two or more thereof.

Illustrative phosphate precursors that may be used in the process(es) include, but are not limited to, $H_3PO_4$, $P_2O_5$, pyrophosphoric acid, polyphosphoric acid, a phosphate salt, and a ammonium phosphates, or a mixture of any two or more thereof. Ammonium phosphate may include materials such as $(NH_4)_2HPO_4$, $(NH_4)H_2PO_4$, or a mixture thereof. In the case of adding metal dopants, the precursor materials may be mixed in this step. Water soluble metal precursors (and hydrate form) may be used as the dopant metal precursors, e.g., metal chloride, metal nitrate, metal sulfate, etc., where metal element can be but not limited to Mg, Ca, Sr, Ba, Sc, Y, Ti, Zr, Hf, V, Nb, Cr, Mo, Co, Cu, Zn, Ga, W, Bi, La, or Ce. In some embodiment, water insoluble metal source such as metal oxides may be used, where these may segregate toward the particle surface to interact more with liquid electrolyte, leading to a stable formation of cathode solid electrolyte interface (C-SEI).

The mol ratio of the water-soluble metal precursor to water-insoluble metal may vary. The mol ratio may be from about 5:95 to 95:5, from about 20:80 to about 80:20, from about 30:70 to about 70:30, from about 40:60 to about 60:40. Individually ratios at any values therebetween these ratios are also contemplated.

The lithium metal phosphates may also be coated with a wide variety of materials, including electron-conducting materials, precursors, or agents, for example carbon coatings. A wide variety of carbon precursors may be used in the processes and at different stages. For example, a carbon coating or conductive carbon precursor agent may be included in the reaction mixture, whereby upon calcination it is converted to the carbon species. Alternatively, the carbon precursor may be included with the combined metal phosphate and lithium precursor. Illustrative carbon precursor agents include, but are not limited to organic acids, saccharides, oxalic acid, citric acid, salicylic acid, malonic acid, sebacic acid, adipic acid, sugar, glucose, ascorbic acid, carbon nanotubes, acetylene black, Polyethylene glycol, Carbon black, graphite, graphene, conductive polymers such as polypyrrole, polystyrene, poly-(3,4-ethylenedioxythiophene) (PEDOT) or a mixture of any two or more thereof. In the systems, the carbon serves a number a number of purposes including providing conductivity to, or enhancing the conductivity of the active materials in, the electrode; enhancing the solubility of the insoluble metal oxide; and enhancing the processability of any electrode active materials.

As noted above, the reaction is carried out in an aqueous medium at low pH (i.e. acidic values). pH is a measure of hydrogen ion concentrations to characterize solutions as acidic (pH<7), neutral (pH=7), or basic (pH>7). In the case of 85% $H_3PO_4$ solution in water, the pH of 0.1 N aqueous solution is approximately 1.5. As the molarity (M) increases and the smaller the $pK_a$, the stronger the acid. $pK_a$ is the negative base-10 logarithm of the acid dissociation constant ($K_a$) of a solution. Strong acids completely dissociate in water, e.g., $HCl$, $HNO_3$, $H_2SO_4$, $HBr$, $HI$, $HClO_4$, and $HClO_3$. There are only a few strong acids but many weak acids, which incompletely dissociate in water to yield an equilibrium state that contails the dissociated ions and a weak acid. A partial list of common weak acids, ordered from strongest to weakest: $HO_2C_2O_2H$ (oxalic acid), $H_2SO_3$ (sulfurous acid), $HSO_4$ (hydrogen sulfate ion), $H_3PO_4$ (phosphoric acid), $HNO_2$ (nitrous acid), $HF$ (hydrofluoric acid), $HCO_2H$ (methanoic acid), $C_6HCOOH$ (benzoic acid), $CH_3COOH$ (acetic acid), and $HCOOH$ (formic acid). Different acid(s) listed above can be used to achieve desired low pH value. Strong acids may be diluted to desired pH value with different amount of water in wt %. In some embodiments, the acidic aqueous medium comprises at least about 10 wt. % water. This may include at least about 20 wt %, at least about 40 wt %, at least about 50 wt %, from about 5 wt % to about 100 wt %, from about 10 wt % to about 90 wt %, or from about 10 wt % to about 50 wt % water.

In some embodiments, the use of a phosphorus containing acid can provide both the acidic medium across a range of pH values, depending on the concentration and the acid, and be a phosphorus source for the lithium metal phosphate.

In the process, the precipitating of the metal phosphate may be carried out at cooler or elevated temperatures. For example, the precipitating may be conducted at a temperature of about 0° C. to about 100° C. This may include from about 10° C. to about 100° C., about 10° C. to about 50° C., about 30° C. to about 100° C., about 30° C. to about 80° C., about 40° C. to about 100° C., about 40° C. to about 90° C., about 50° C. to about 100° C., or about 50° C. to about 80° C.

In the process, it is noted that the metal phosphate is collected. The collecting may be done by filtration, followed by washing the metal phosphate to remove the impurity with water, additional aqueous medium, or a polar solvent that is more readily evaporated for drying of the metal phosphate. In some embodiments, the metal phosphate is dried prior to mixing with the lithium precursor or prior to calcining. For example, the metal phosphate may be spray dried. When spray-dried particles of the metal phosphate may exhibit a volume-average diameter of about 1 micrometer to about 20 micrometers. In another embodiment, the average particle diameter size (D50) is about 2 to 10 micrometers.

To enhance the purity of the metal phosphate prior to calcination, the metal phosphate may be optionally recrystallized. Recrystallization may involve dissolving or washing the metal phosphate to be purified with another solvent such as acetone, isopropyl alcohol, ethanol, or mixture thereof, that will not react with the solute. Optionally, the single or mixture solvent(s) containing the solute may be heated. In order to recrystallize back the metal phosphate, the solution may need a nucleation step, where a small disturbance such as scratching, cracking, temperature control, agiation, and/or ultrasonification may be used for allowing the formation of the crystals.

In another aspect, the lithium metal phosphate obtained by any of the above processes is provided. Due to the use of different precursor mixtures, the morphology of the nucleation seed may be affected. This may be due to variations in amount or type of impurities in different starting precursor materials (i.e., the combination of water-soluble and water-insoluble precursors), which can ultimately affect the embryo, cluster, nuclei, and growth of the particle seed. Non-limiting examples include the changes in the surface free energy, $\Delta G_s = 4\pi r^2 \gamma$, where $\gamma$ is the surface tension. Increase in the $\Delta G_s$ means that it will take higher energy to make an interface, which destabilize the nuclei. When $\Delta G_s$ is lower, then it is easier to yield a larger radius metal phosphate particle. In some embodiment, the shape of metal phosphates may be circular, ellipsoid, cylindrical, cubic, octahedron, rhombic-dodecahedron, plate, spheroid, sphere, column, aggregate, pyramid, prism, tetrahedron, pentagon, or mixture thereof. One non-limiting example includes increased halide concentration (e.g., Cl⁻) changes the equilibrium particle shape from octahedron toward cubic. The lithium metal phosphate obtained by any of the above processes can be characterized by a mixed morphology which can provide an advantage of greater packing density compared to lithium metal phosphate materials obtained with other methods, the packing density being defined as mass weight of materials per given electrode volume (e.g., gram per cubic centimeter). This may improve or increase the energy density of the battery cell comprising the lithium metal phosphate electroactive material obtained by any of the above processes as compared to a battery cell comprising lithium metal phosphate formed by other methods.

Also provided, in some embodiments, is an electrochemical cell that includes the lithium metal phosphate obtained by any of the above processes. Such electrochemical cells may be included in an electric vehicle.

Where the electrochemical cell includes the lithium metal phosphate, it may be incorporated into a cathode or anode. Such cathodes and anodes may also include conductive carbons materials, binders, a current collector, or any one or more such items. In some embodiments, the anode may comprise a current collector (e.g., Cu foil) and an in situ-formed anode (e.g., Li metal) on a surface of the current collector facing the separator or solid-state electrolyte such that in an uncharged state. In such embodiments, the assembled cell does not comprise an anode active material.

Illustrative conductive carbon species include graphite, carbon black, Super P carbon black material, Ketjen Black, Acetylene Black, SWCNT, MWCNT, graphite, carbon nanofiber, and/or graphene, graphite. Illustrative binders may include, but are not limited to, polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Other illustrative binder materials can include one or more of: agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(methyl acrylate) (PMA), poly(vinyl alcohol) (PVA), poly(vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof. The cathode current collector may include a metal that is aluminum, copper, nickel, titanium, stainless steel, or carbonaceous materials. In some embodiments, the metal of the current collector is in the form of a metal foil. In some specific embodiments, the current collector is an aluminum (Al) or copper (Cu) foil. In some embodiments, the current collector is a metal alloy, made of Al, Cu, Ni, Fe, Ti, or combination thereof. In another embodiment, the metal foils may be coated with carbon: e.g., carbon-coated Al foil, and the like.

Illustrative conductive carbon species include, but are not limited to, graphite, carbon black, Super P carbon black material, Ketjen Black, Acetylene Black, SWCNT, MWCNT, graphite, carbon nanofiber, and/or graphene, graphite. Illustrative binders include, but are not limited to, polymeric material such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Other illustrative binder materials can include one or more of: agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(methyl acrylate) (PMA), poly(vinyl alcohol) (PVA), poly(vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof. The solvent used in the slurry formation may be a ketone, an ether, a heterocyclic ketone, and/or distilled water. One illustrative solvent is N-methylpyrrolidone ("NMP"). The solvent may be removed by allowing the solvent to evaporate at ambient or elevated temperature, or at ambient pressure or reduced pressure. Handling of the cathode and other lithium ion battery internal components may be conducted under an inert atmosphere ($N_2$, He, Ag, etc.), according to some embodiments. The cathode current collector may include a metal that is that is aluminum, copper, nickel, titanium, stainless steel, or carbonaceous materials. In some embodiments, the metal of the current collector is in the form of a metal foil. In some specific embodiments, the current collector is an aluminum (Al) or copper (Cu) foil. In some embodiment, the current collector is a metal alloy, made of Al, Cu, Ni, Fe, Ti, or combination thereof. In another embodiment, the metal foils maybe coated with carbon: e.g., carbon-coated Al foil, etc.

In a further aspect, a battery cell is provided that includes a cathode, an anode, an electrolyte, and, optionally a separator between the cathode and anode, wherein the cathode, the anode, or both the cathode and the anode include any of the lithium metal phosphates prepared by any of the processes above.

In the battery cell, the electrolyte may be a solution phase electrolyte or a solid-state electrolyte. Solution phase electrolytes may include a lithium salt such as lithium hexafluorophosphate ($LiPF_6$), lithium tetrafluoroborate ($LiBF_4$), lithium perchlorate ($LiClO_4$), lithium bis-trifluoromethanesulfonimide (LiTFSI), or lithium difluoro(oxalate)borate (LiDFOB), and a carbonate solvent such as a dimethyl carbonate (DMC), ethylene carbonate (EC), and diethyl carbonate (DEC), among others. Solid-state electrolytes may include a metal oxide, a metal sulfide, or a metal phosphate crystalline structure that is electronically insulating but ionically conductive (i.e., allows lithium-ion migration). Such battery cells may be prismatic, cylindrical, or pouch type cells.

In another aspect, the present disclosure provides a battery pack comprising the cathode active material, the electrochemical cell, or the lithium ion battery of any one of the above embodiments. The battery pack may find a wide variety of applications including but are not limited to general energy storage or in vehicles.

Figure 2:
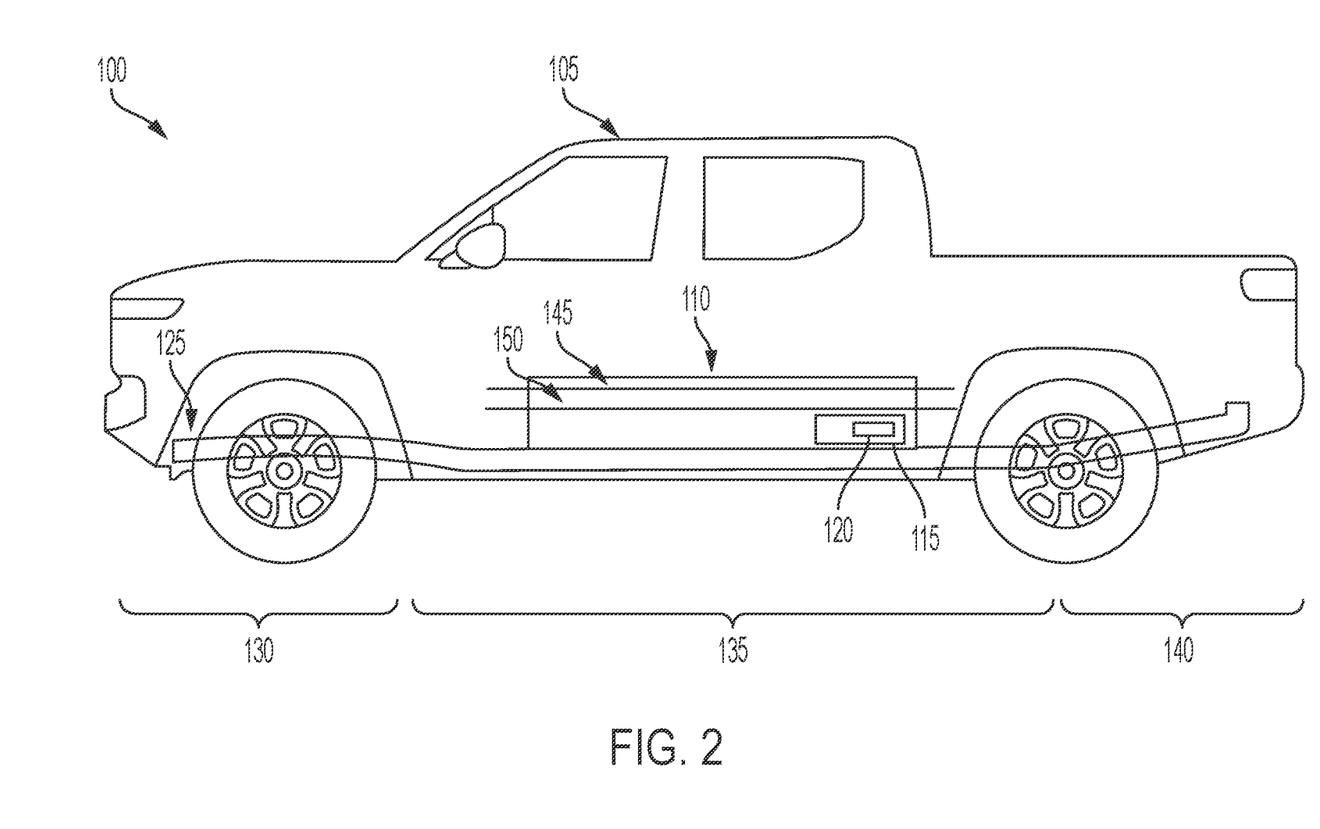
FIG. 2 is an illustration of a cross-sectional view of an electric vehicle, according to various embodiments.

In another aspect, a plurality of battery cells as described above may be used to form a battery and/or a battery pack, that may find a wide variety of applications such as general storage, or in vehicles. By way of illustration of the use of such batteries or battery packs in an electric vehicle, FIG. 2 depicts is an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Figure 3:
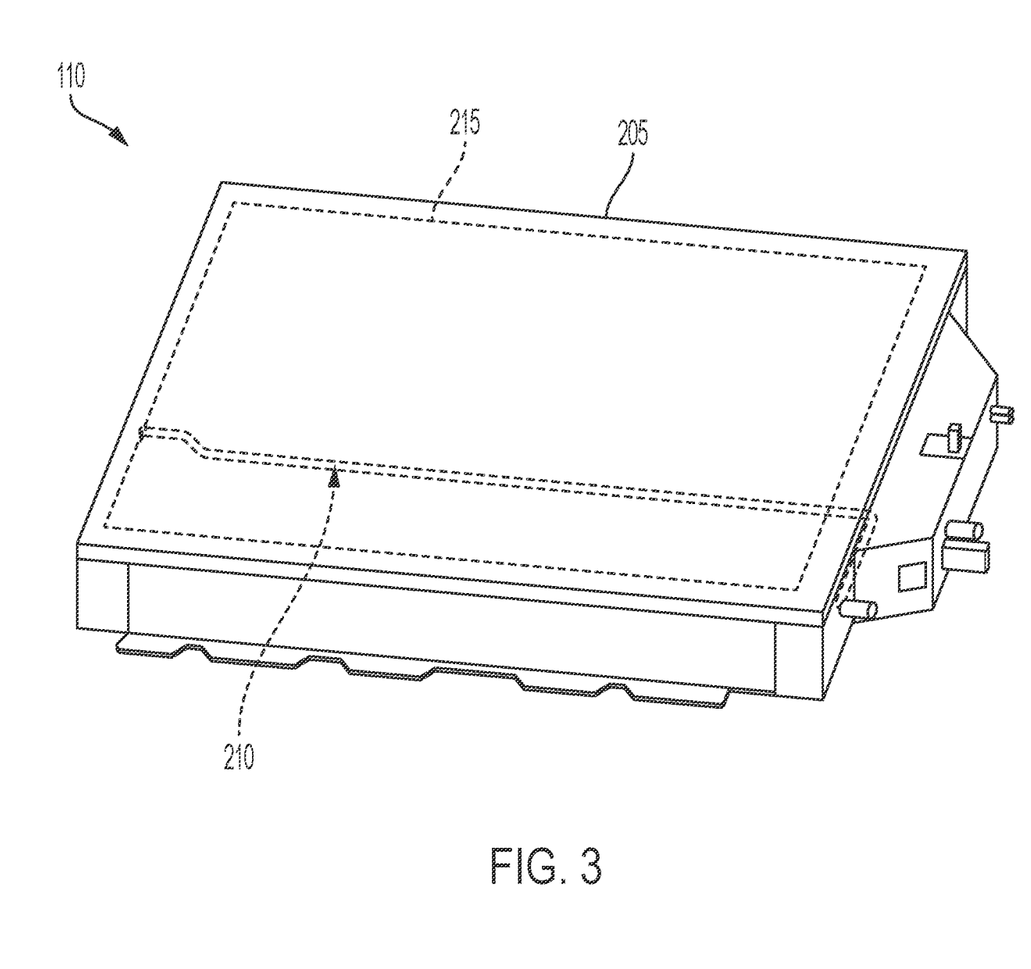
FIG. 3 is a depiction of an illustrative battery pack, according to various embodiments.

FIG. 3 depicts an example battery pack 110. Referring to FIG. 3, among others, the battery pack 110 can provide power to electric vehicle 105. Battery packs 110 can include any arrangement or network of electrical, electronic, mechanical, or electromechanical devices to power a vehicle of any type, such as the electric vehicle 105. The battery pack 110 can include at least one housing 205. The housing 205 can include at least one battery module 115 or at least one battery cell 120, as well as other battery pack components. The housing 205 can include a shield on the bottom or underneath the battery module 115 to protect the battery module 115 from external conditions, for example if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one cold plate 215. The cold plate 215 can be positioned in relation to a top submodule and a bottom submodule, such as in between the top and bottom submodules, among other possibilities. The battery pack 110 can include any number of cold plates 215. For example, there can be one or more cold plates 215 per battery pack 110, or per battery module 115. At least one cooling line 210 can be coupled with, part of, or independent from the cold plate 215.

Figure 4:
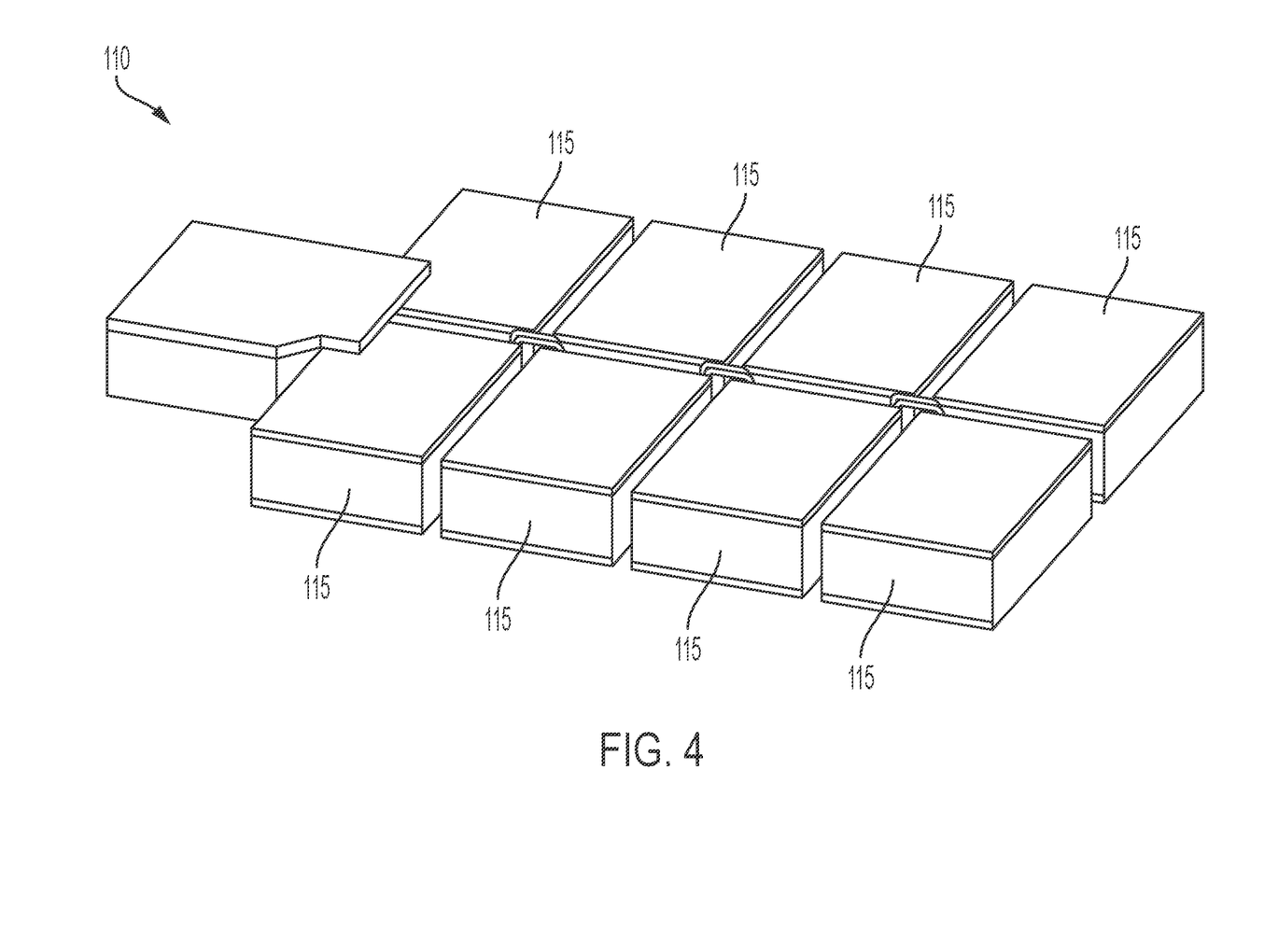
FIG. 4 is a depiction of an illustrative battery module, according to various embodiments.
Figure 5:
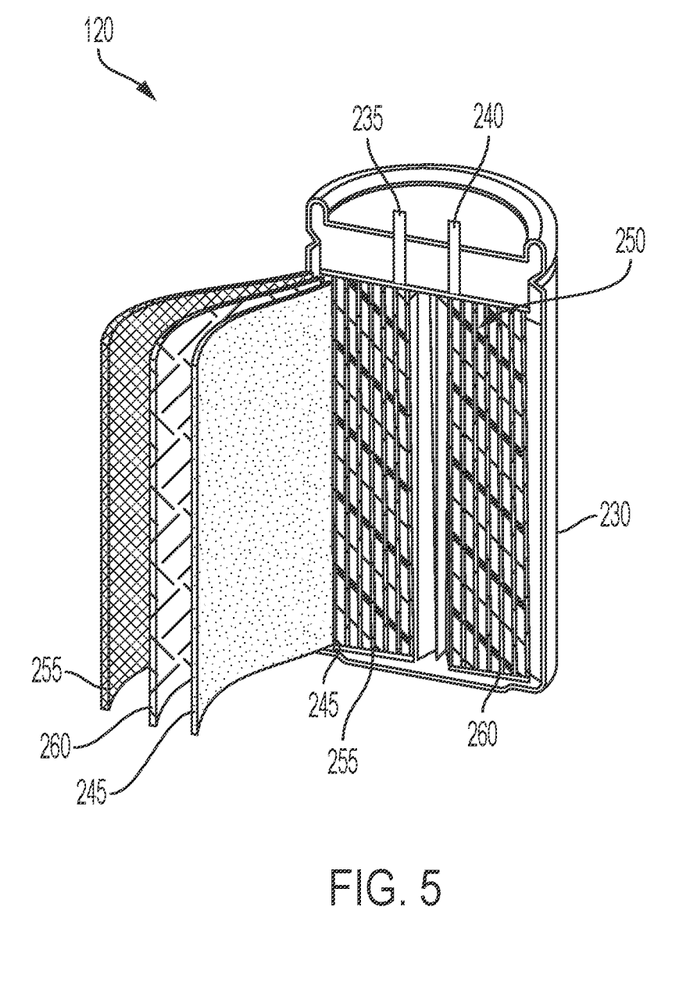
FIG. 5 is a depiction of an illustrative battery with an illustrative cross sectional view, according to various embodiments.

FIG. 4 depicts example battery modules 115, and FIG. 5 depicts an illustrative cross sectional view of a battery cell 120. The battery modules 115 can include at least one submodule. For example, the battery modules 115 can include at least one first (e.g., top) submodule 220 or at least one second (e.g., bottom) submodule 225. At least one cold plate 215 can be disposed between the top submodule 220 and the bottom submodule 225. For example, one cold plate 215 can be configured for heat exchange with one battery module 115. The cold plate 215 can be disposed or thermally coupled between the top submodule 220 and the bottom submodule 225. One cold plate 215 can also be thermally coupled with more than one battery module 115 (or more than two submodules 220, 225). The battery submodules 220, 225 can collectively form one battery module 115. In some examples each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a cold plate 215 in between the top submodule 220 and the bottom submodule 225. The battery pack 110 can include or define a plurality of areas for positioning of the battery module 115. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120.

Battery cells 120 have a variety of form factors, shapes, or sizes. For example, battery cells 120 can have a cylindrical, rectangular, square, cubic, flat, or prismatic form factor. Battery cells 120 can be assembled, for example, by inserting a winded or stacked electrode roll (e.g., a jellyroll) including electrolyte material into at least one battery cell housing 230. The electrolyte material, e.g., an ionically conductive fluid or other material, can generate or provide electric power for the battery cell 120. A first portion of the electrolyte material can have a first polarity, and a second portion of the electrolyte material can have a second polarity. The housing 230 can be of various shapes, including cylindrical or rectangular, for example. Electrical connections can be made between the electrolyte material and components of the battery cell 120. For example, electrical connections with at least some of the electrolyte material can be formed at two points or areas of the battery cell 120, for example to form a first polarity terminal 235 (e.g., a positive or anode terminal) and a second polarity terminal 240 (e.g., a negative or cathode terminal). The polarity terminals can be made from electrically conductive materials to carry electrical current from the battery cell 120 to an electrical load, such as a component or system of the electric vehicle 105.

The battery cell 120 can be included in battery modules 115 or battery packs 110 to power components of the electric vehicle 105. The battery cell housing 230 can be disposed in the battery module 115, the battery pack 110, or a battery array installed in the electric vehicle 105. The housing 230 can be of any shape, such as cylindrical with a circular (e.g., as depicted), elliptical, or ovular base, among others. The shape of the housing 230 can also be prismatic with a polygonal base, such as a triangle, a square, a rectangle, a pentagon, and a hexagon, among others.

The housing 230 of the battery cell 120 can include one or more materials with various electrical conductivity or thermal conductivity, or a combination thereof. The electrically conductive and thermally conductive material for the housing 230 of the battery cell 120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 230 of the battery cell 120 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others.

The battery cell 120 can include at least one anode layer 245, which can be disposed within the cavity 250 defined by the housing 230. The anode layer 245 can receive electrical current into the battery cell 120 and output electrons during the operation of the battery cell 120 (e.g., charging or discharging of the battery cell 120). The anode layer 245 can include an active substance.

The battery cell 120 can include at least one cathode layer 255 (e.g., a composite cathode layer compound cathode layer, a compound cathode, a composite cathode, or a cathode). The cathode layer 255 can be disposed within the cavity 250. The cathode layer 255 can output electrical current out from the battery cell 120 and can receive electrons during the discharging of the battery cell 120. The cathode layer 255 can also release lithium ions during the discharging of the battery cell 120. Conversely, the cathode layer 255 can receive electrical current into the battery cell 120 and can output electrons during the charging of the battery cell 120. The cathode layer 255 can receive lithium ions during the charging of the battery cell 120.

The battery cell 120 can include an electrolyte layer 260 disposed within the cavity 250. The electrolyte layer 260 can be arranged between the anode layer 245 and the cathode layer 255 to separate the anode layer 245 and the cathode layer 255. The electrolyte layer 260 can transfer ions between the anode layer 245 and the cathode layer 255. The electrolyte layer 260 can transfer cations from the anode layer 245 to the cathode layer 255 during the operation of the battery cell 120. The electrolyte layer 260 can transfer cations (e.g., lithium ions) from the cathode layer 255 to the anode layer 245 during the operation of the battery cell 120.

The present invention, thus generally described, will be understood more readily by reference to the following examples, which are provided by way of illustration and are not intended to be limiting of the present invention.

EXAMPLES

Example 1. Described is a process to use abundant, less expensive starting materials for the preparation of lithium metal phosphates as active materials for incorporation in the electrodes of lithium ion batteries. For example, the process described herein may be based upon the base starting metals or the metal oxides thereof. In a typical co-precipitation route, metal oxide materials are not used because they are not soluble in water to an appreciate extent.

As an illustration of the process, iron oxide is used as a starting material. In order to make the iron oxide(s) soluble, the pH of the surrounding medium is adjusted to lower values (i.e. acidic). Concentrated phosphoric acid ($H_3PO_4$) may be used for pH adjustment as it is acidic, but also may be a source of the phosphorus in the final products.

Low cost materials, such as $Li_2CO_3$, among others, may be used as the lithium source. The low solubility of materials such as $Li_2CO_3$ may be increased through the use of an acidic medium, bubbling $CO_2$ gas to convert to $Li_2CO_3$ to $LiHCO_3$, etc., in conjunction with water-soluble chemicals such as $FeCl_3$, $FeSO_4$, $LiOH$, and/or $NH_4H_2PO_4$. An illustration of the process is shown in FIG. 1.

Figure 1:
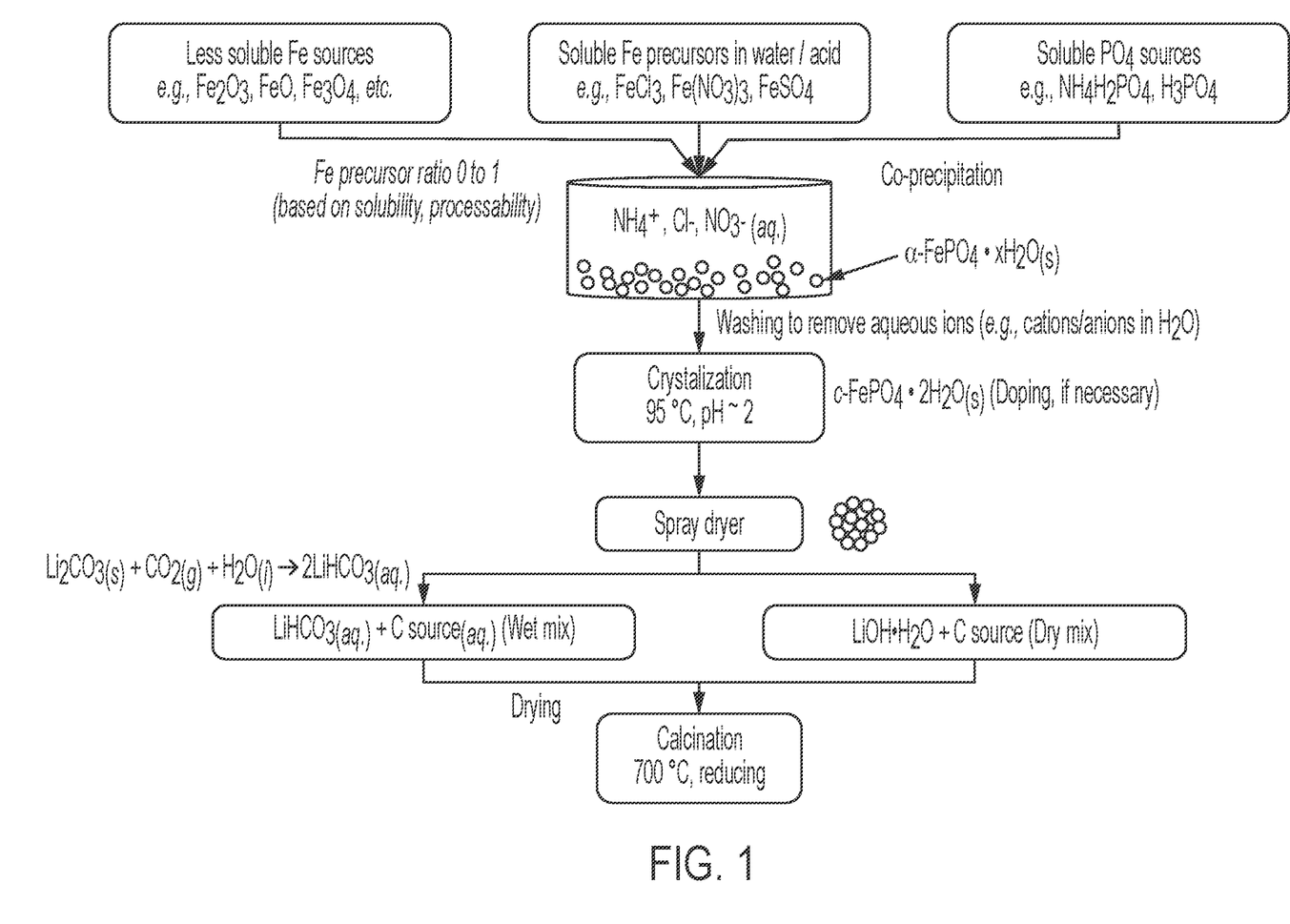
FIG. 1 is schematic flow diagram of the process of preparing a lithium metal phosphate, according to various embodiments.

FIG. 1 is a process flow diagram for the processes described herein. The process include a mixture of iron sources: i) raw precursor chemicals that can dissolve in acidic condition (rather slowly), i.e., difficult to dissolve in neutral pH=7 water, such as $Fe_2O_3$, $Fe_3O_4$, and $FeO$; and ii) more soluble Fe-containing species such as $FeCl_3$, $FeSO_4$, $FeNO_3$ (typically in hydrates form, but may be in anhydrous form). In a co-precipitation reactor, together with a phosphorus source, the materials may form $FePO_4 \cdot xH_2O$ materials (typically in yellowish powders). The use of different iron sources may include the use of temperature, more acidic media, and longer reaction times. Depending on the reactant ratio, dispersion, particle size distribution, impurity level after washing/filtering process, a secondary crystallization step at lower pH at elevated temperatures (60 to 95° C.) may be performed to crystallize $FePO_4 \cdot xH_2O$ precursor materials. The solution containing $FePO_4 \cdot xH_2O$ precursor materials may be dried, optionally using a spray dryer to form a spherical secondary particle where average D50 size may vary from 1 to 20 μm in diameter. The resulting powders may then be mixed with a lithium salt such as $LiOH \cdot H_2O$ and/or $Li_2CO_3$ and carbon coating sources (typically, organic sugar molecules such as sucrose or glucose, etc.).

$LiOH \cdot H_2O$ is an example of a lithium source. It may be used where a heat treatment temperature for $LiFePO_4$ is relatively low, i.e., <800° C. maximum. Lithium carbonate ($Li_2CO_3$) can be more difficult to be fully decomposed at this temperature range. In some markets $Li_2CO_3$ may be less a expensive lithium precursor, however in others LiOH may be less expensive. This disclosure can provide flexibility in use of various lithium precursors which can be selected or changed based on a current market price. In this disclosure, we disperse $Li_2CO_3$ into $H_2O$ and use $CO_2$ gas bubbling and/or oxalic acid, which help converting $Li_2CO_3$ into $LiHCO_{3(aq.)}$. Here, oxalic acid also can be used as the carbon coating source upon thermal decomposition that can increase the electrical conductivity of resulting lithium iron phosphate powders. Depending on the co-precipitation reaction conditions, precursor quality, and subsequent heat treatment temperature/environment, the final materials and electrochemical properties of $LiFePO_4$ may be impacted significantly.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions that can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A process of preparing a lithium metal phosphate, the process comprising:
   contacting a water-soluble metal precursor, a water-insoluble metal precursor, and a phosphate precursor in an acidic aqueous medium to form a reaction mixture; precipitating a metal phosphate from the reaction mixture; collecting the metal phosphate;
   combining the metal phosphate with a lithium precursor; and
   calcining the combined metal phosphate and lithium precursor at elevated temperature to form a lithium metal phosphate;
   wherein a mol ratio of water-soluble metal precursor to water-insoluble metal precursor is from 0.5:99.5 to 99.5:0.5.

2. The process of claim 1, wherein the water-insoluble metal precursor comprises iron metal, iron oxide, manganese metal, a manganese oxide, cobalt metal, a cobalt oxide, nickel metal, a nickel oxide, or a mixture of any two or more thereof.

3. The process of claim 1, wherein the water-soluble metal precursor comprises a metal halide, a metal nitrate, a metal sulfate, or a mixture of any two or more thereof.

4. The process of claim 3, wherein the water-soluble metal precursor comprises $FeCl_2$, $FeCl_3$, $FeCl_2 \cdot 4H_2O$, $FeCl_3 \cdot 6H_2O$, $Fe(NO_3)_3$, $Fe(NO_3)_3 \cdot 6H_2O$, $Fe(NO_3)_3 \cdot 9H_2O$, $FeSO_4$, $FeSO_4 \cdot 6H_2O$, $FeSO_4 \cdot 7H_2O$, $MnCl_2$, $MnCl_2 \cdot H_2O$, $MnCl_2 \cdot 4H_2O$, $MnCl_2 \cdot xH_2O$, $Mn(NO_3)_2$, $Mn(NO_3)_2 \cdot xH_2O$, $Mn(NO_3)_2 \cdot 4H_2O$, $MnSO_4$, $MnSO_4 \cdot xH_2O$, $MnSO_4 \cdot 4H_2O$, $NiCl_2$, $NiCl_2 \cdot 6H_2O$, $Ni(NO_3)_2$, $Ni(NO_3)_2 \cdot 6H_2O$, $NiSO_4$, $NiSO_4 \cdot 6H_2O$, $NiSO_4 \cdot 7H_2O$, $CoCl_2$, $CoCl_2 \cdot xH_2O$, $CoCl_2 \cdot 6H_2O$, $Co(NO_3)_2$, $Co(NO_3)_2 \cdot 6H_2O$, $CoSO_4$, $CoSO_4 \cdot xH_2O$, $CoSO_4 \cdot 7H_2O$, or a mixture of any two or more thereof.

5. The process of claim 1, wherein the phosphate precursor is an acid or forms an acid to acidify the acid aqueous medium.

6. The process of claim 1, wherein the phosphate precursor comprises $H_3PO_4$, $P_2O_5$, pyrophosphoric acid, polyphosphoric acid, a phosphate salt, and a ammonium phosphates, or a mixture of any two or more thereof.

7. The process of claim 1, wherein a mol ratio of water-soluble metal precursor to water-insoluble metal precursor is from 20:80 to 80:20.

8. The process of claim 1, wherein the water-insoluble metal source comprises $Fe_2O_3$, $Fe_3O_4$, $FeO$, $FeC_2O_4$, $FeC_2O_4 \cdot 2H_2O$, or a mixture of any two or more thereof.

9. The process of claim 1, wherein the lithium precursor comprises $LiOH$, $LiOH \cdot H_2O$, $LiHCO_3$, or a mixture of any two or more thereof.

10. The process of claim 1, wherein the reaction mixture further comprises a carbon coating precursor agent.

11. The process of claim 10, wherein the lithium metal phosphate is characterized by a mixed morphology exhibiting a greater packing density compared to lithium metal phosphate materials obtained processes in which a water-soluble metal precursor is not combined with a water-insoluble metal precursor, and wherein the packing density being defined as mass weight of materials per given electrode volume.

12. The process of claim 10, wherein the carbon coating precursor agent comprises oxalic acid, citric acid, sugar, glucose, ascorbic acid, or a mixture of any two or more thereof.

13. The process of claim 1, wherein the combining the metal phosphate with the lithium precursor further comprises adding a carbon source prior to calcining.

14. The process of claim 13, wherein the carbon source comprises oxalic acid, citric acid, sugar, glucose, ascorbic acid, or a mixture of any two or more thereof.

15. The process of claim 1, wherein the acid aqueous medium further comprises one or more polar solvents other than water.

16. The process of claim 1, wherein the collecting comprising collecting the metal phosphate via filtration and washing the metal phosphate with an aqueous solution.

17. The process of claim 1 further comprising drying the metal phosphate prior to calcining.

18. The process of claim 15, wherein the drying comprises spray drying to yield particles of the metal phosphate exhibiting a volume-average diameter of about 1 micrometer to about 20 micrometers.

19. The process of claim 1, wherein the precipitating is conducted at a temperature of about 0° C. to about 100° C.

20. The process of claim 1 further comprising recrystallizing the metal phosphate.

\* \* \* \* \*